(12) United States Patent
Suzuki et al.

(10) Patent No.: US 10,339,345 B2
(45) Date of Patent: Jul. 2, 2019

(54) CARD PROCESSING APPARATUS AND AUTOMATIC TRANSACTION MACHINE

(71) Applicant: HITACHI-OMRON TERMINAL SOLUTIONS, CORP., Tokyo (JP)

(72) Inventors: Hiroyuki Suzuki, Tokyo (JP); Yukio Aoyama, Tokyo (JP)

(73) Assignee: HITACHI-OMRON TERMINAL SOLUTIONS, CORP., Tokyo (JP)

( * ) Notice: Subject to any disclaimer, the term of this patent is extended or adjusted under 35 U.S.C. 154(b) by 0 days.

(21) Appl. No.: 15/870,580

(22) Filed: Jan. 12, 2018

(65) Prior Publication Data
US 2018/0293410 A1    Oct. 11, 2018

(30) Foreign Application Priority Data

Apr. 7, 2017  (JP) ................................. 2017-076463

(51) Int. Cl.
| | |
|---|---|
| G06Q 40/00 | (2012.01) |
| G07D 11/00 | (2019.01) |
| G07F 19/00 | (2006.01) |
| G06K 7/08 | (2006.01) |
| G06K 7/00 | (2006.01) |
| G06Q 20/10 | (2012.01) |
| G06K 13/08 | (2006.01) |

(52) U.S. Cl.
CPC .......... *G06K 7/084* (2013.01); *G06K 7/0004* (2013.01); *G06K 7/0069* (2013.01); *G06K 13/085* (2013.01); *G06Q 20/1085* (2013.01); *G07F 19/20* (2013.01)

(58) Field of Classification Search
USPC ........ 235/375, 379, 380, 449, 475, 493, 381
See application file for complete search history.

(56) References Cited

U.S. PATENT DOCUMENTS 8,333,323 B2 * 12/2012 Richardson .......... G06K 7/0008
                                                              235/375
9,218,597 B2 * 12/2015 Gannon ................. G06Q 20/20
(Continued)

FOREIGN PATENT DOCUMENTS

JP            967169 A          1/1979

OTHER PUBLICATIONS

Korean Office Action dated Nov. 27, 2018 for the Korean Patent Application No. 10-2017-0163846.

*Primary Examiner* — Tuyen K Vo
(74) *Attorney, Agent, or Firm* — Volpe and Koenig, P.C.

(57) ABSTRACT

A card processing apparatus includes a card insertion opening, and a card insertion detection sensor. A magnetic card is to be inserted in the card insertion opening. The card insertion detection sensor is configured to detect the magnetic card inserted in the card insertion opening. A magnetic head is provided near the card insertion opening and is configured to detect a change in an electromagnetic field and output a magnetic signal. A control unit is configured to: receive the magnetic signal from the magnetic head when the card insertion detection sensor detects the magnetic card; receive magnetic signal from the magnetic head when the card insertion detection sensor does not detect the magnetic card; acquire the magnetic signal when the magnetic signal includes a predetermined pattern; and discard the magnetic signal when the magnetic signal does not include the predetermined pattern.

14 Claims, 12 Drawing Sheets

(56) References Cited

U.S. PATENT DOCUMENTS

| | | | |
|---|---|---|---|
| 2006/0022046 A1* | 2/2006 | Iwamura | G06K 7/0004 |
| | | | 235/451 |
| 2010/0191369 A1* | 7/2010 | Kim | G07F 5/18 |
| | | | 700/235 |
| 2014/0084049 A1* | 3/2014 | Shima | G06F 3/1204 |
| | | | 235/3 |
| 2014/0092422 A1* | 4/2014 | Shima | G06F 3/1204 |
| | | | 358/1.14 |
| 2014/0378206 A1* | 12/2014 | Weatherby | G07F 17/3213 |
| | | | 463/20 |
| 2015/0097029 A1* | 4/2015 | Lin | G06Q 20/352 |
| | | | 235/380 |
| 2016/0171492 A1* | 6/2016 | Carrott | G06Q 20/3829 |
| | | | 705/71 |
| 2018/0150658 A1* | 5/2018 | Franklin | G06K 7/087 |

* cited by examiner

[Fig. 1]
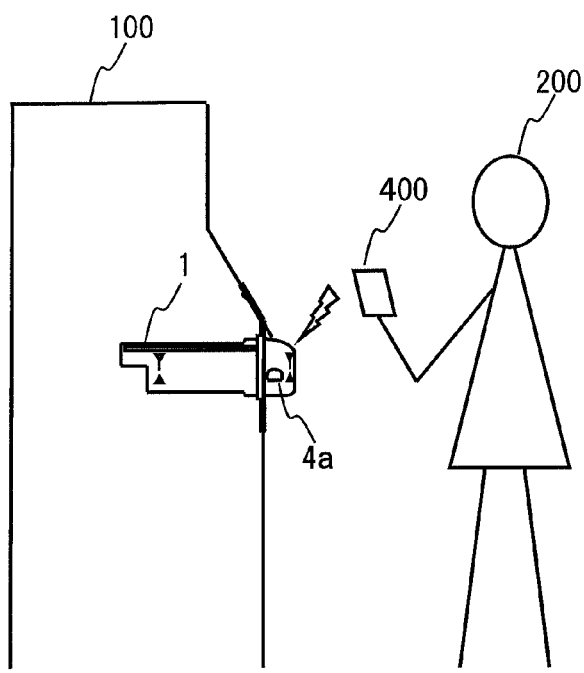

[Fig. 2]
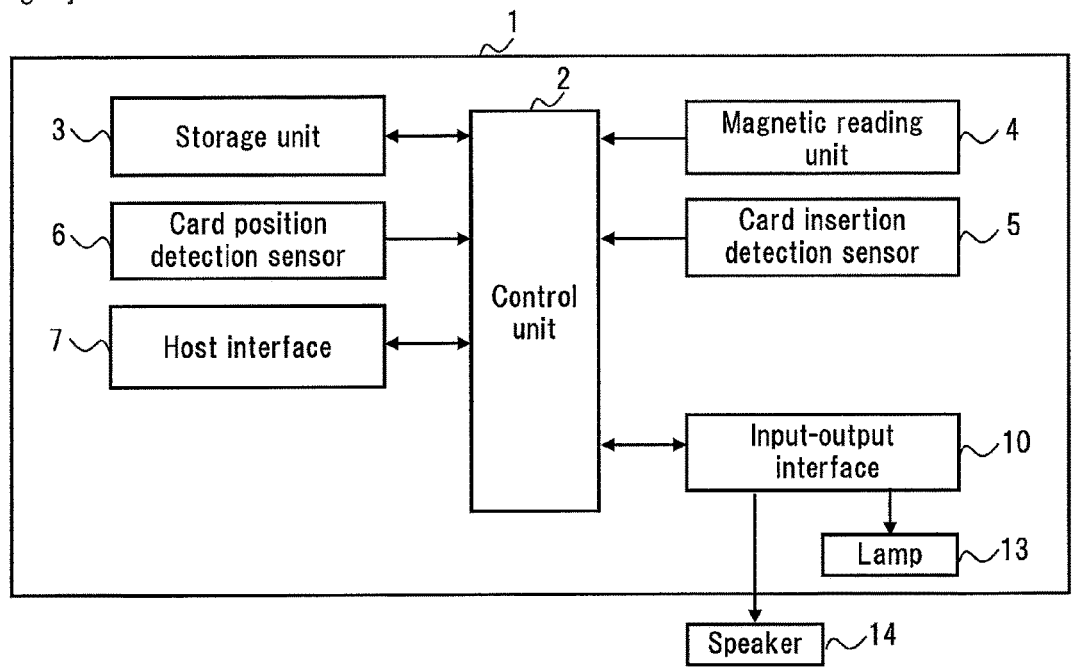

[Fig. 3]
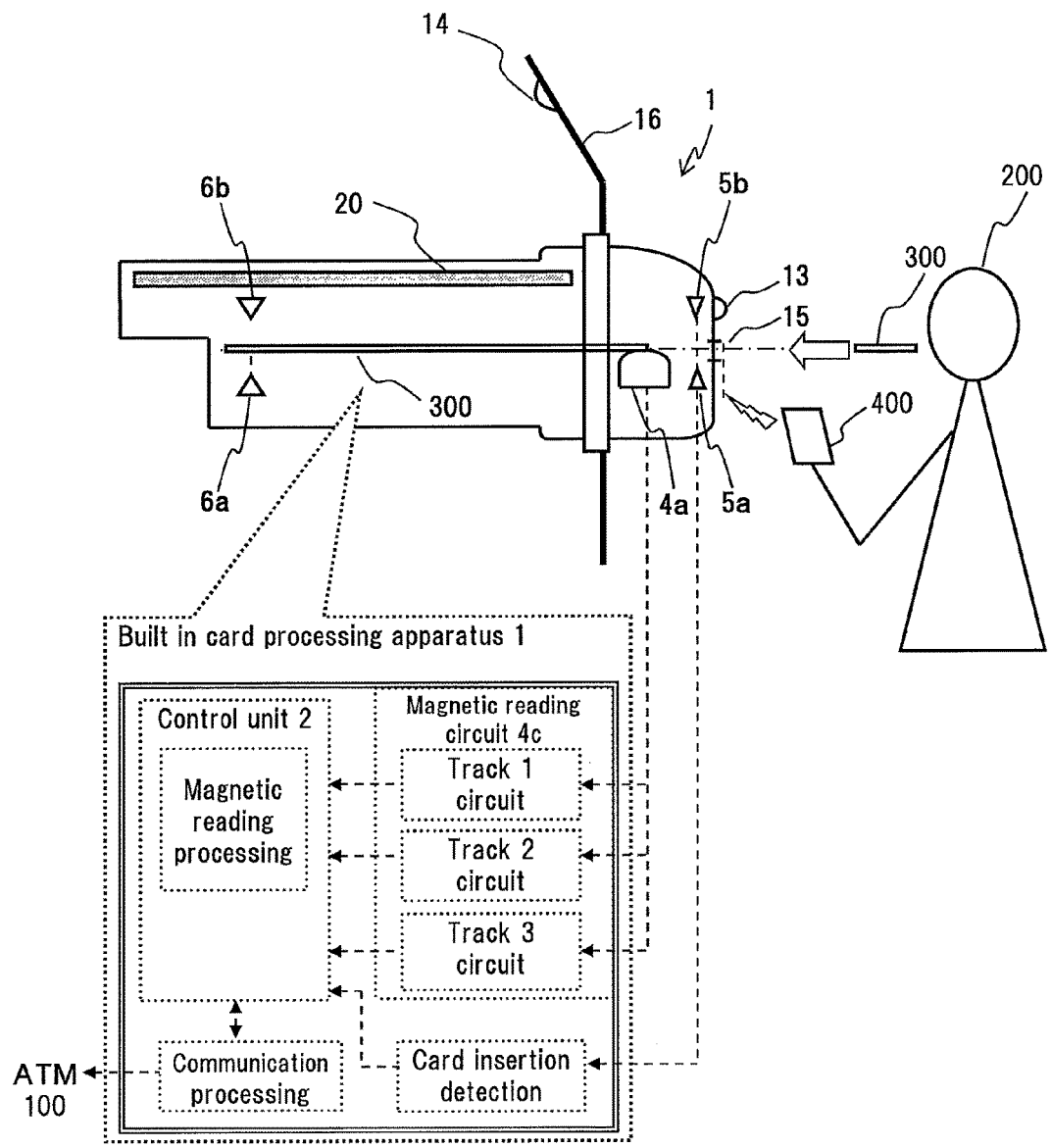

[Fig. 4]
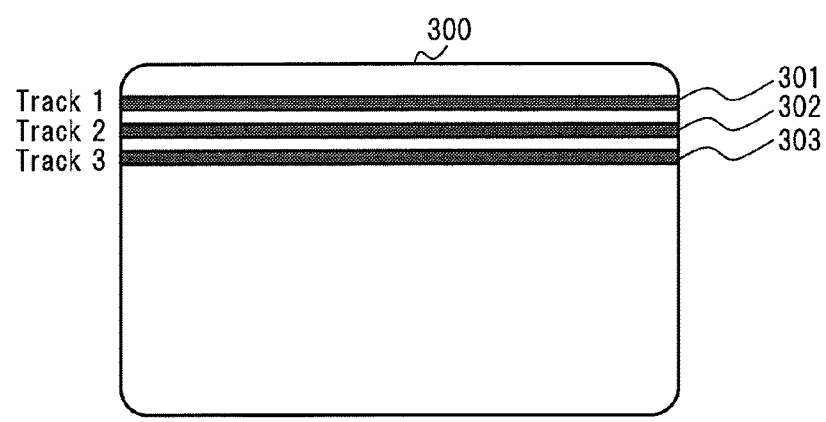

[Fig. 5]
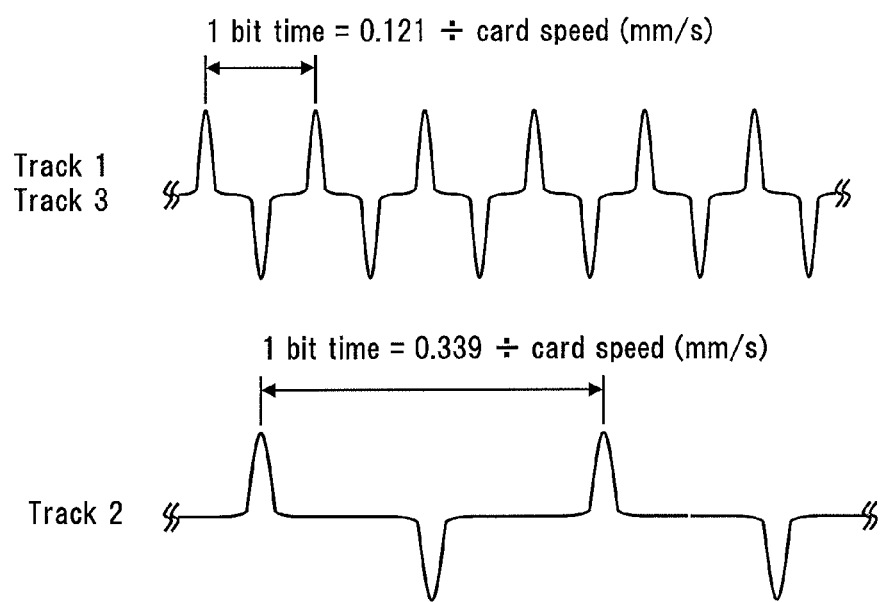

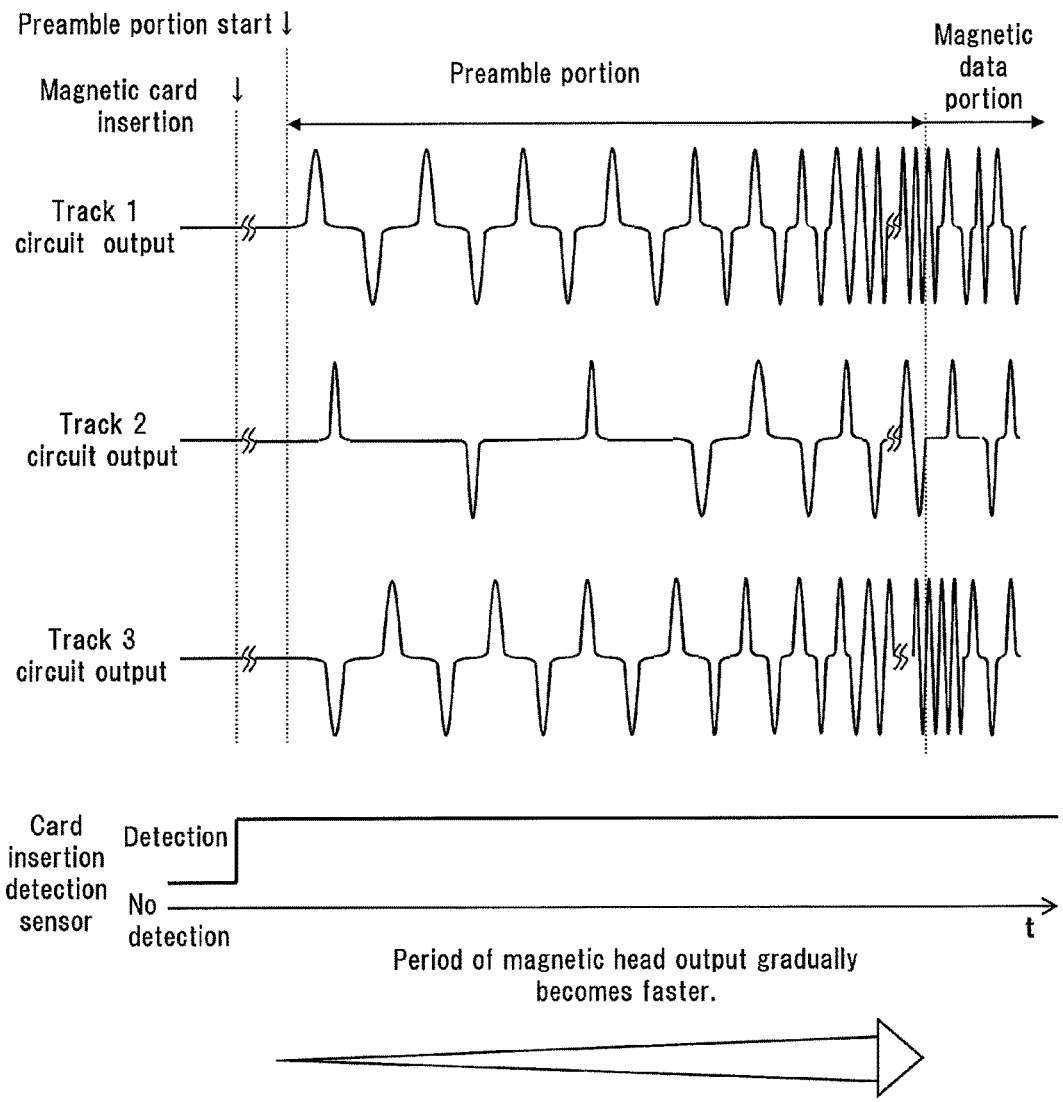

[Fig. 7]
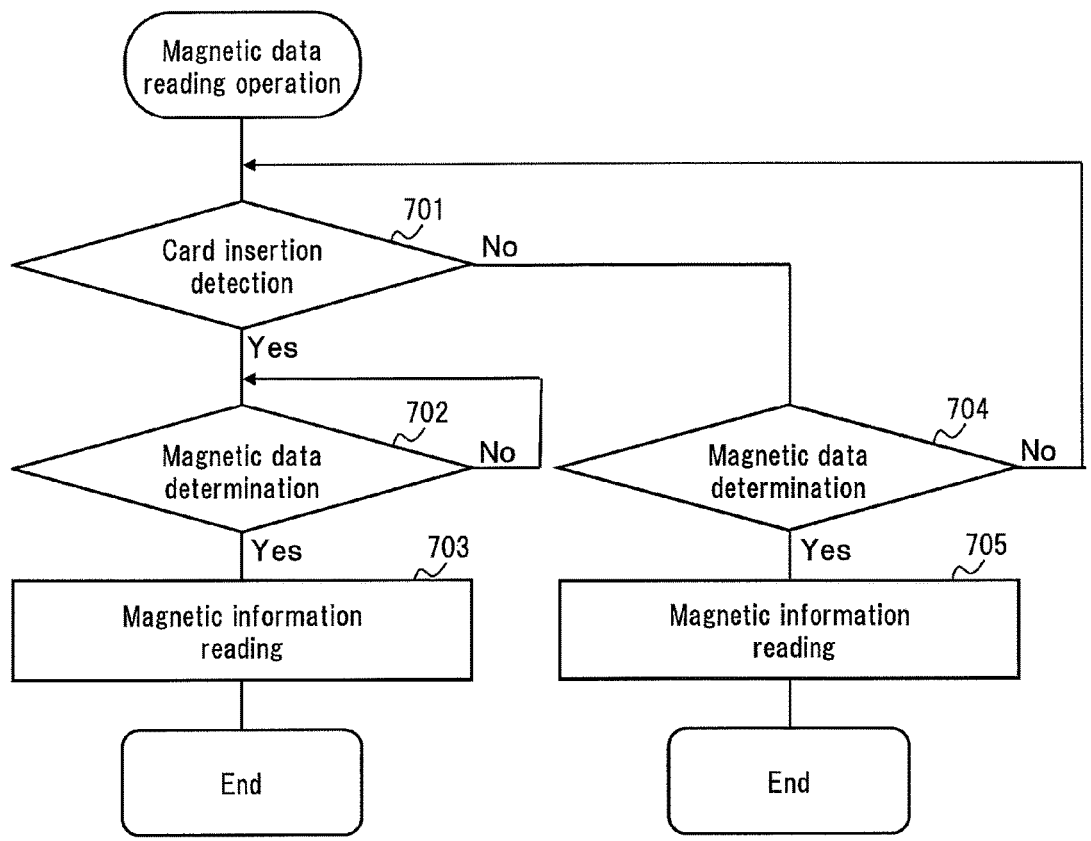

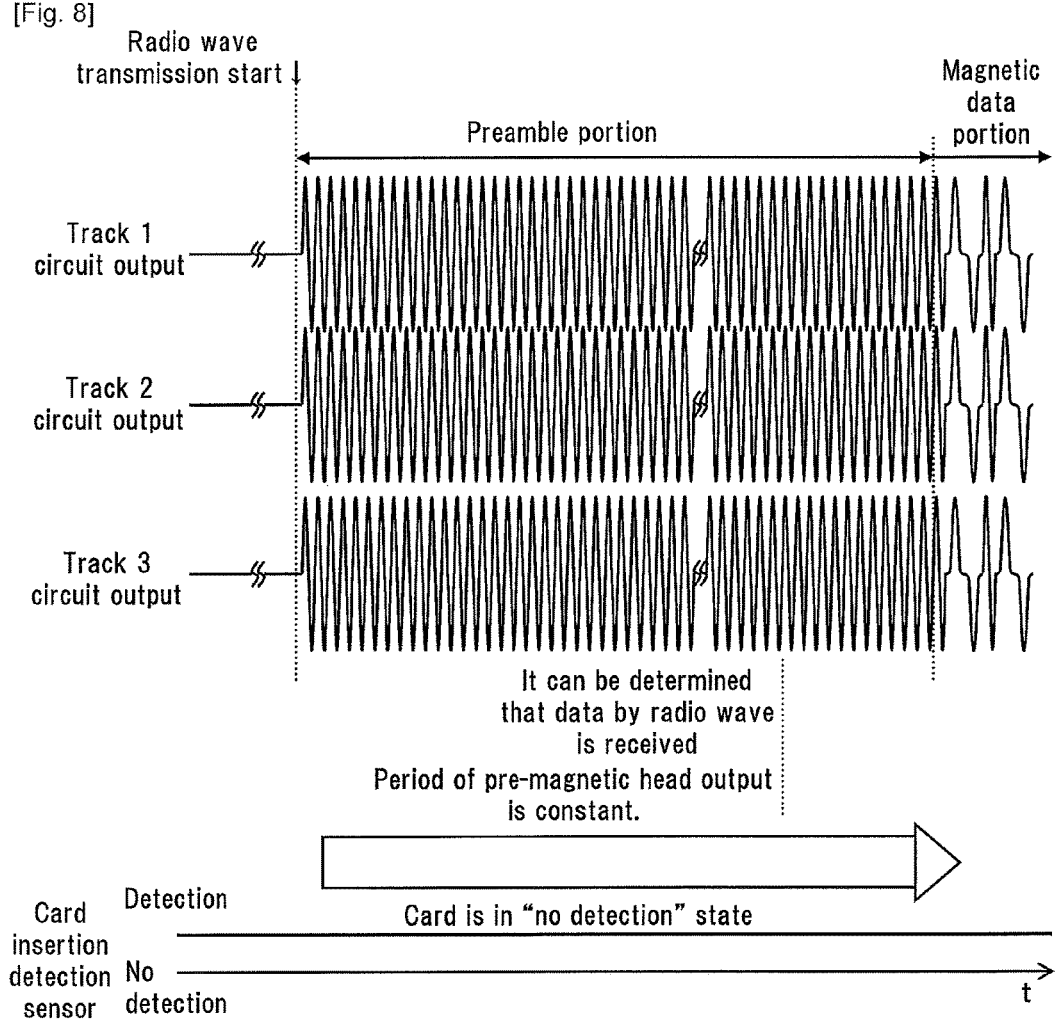

[Fig. 9]
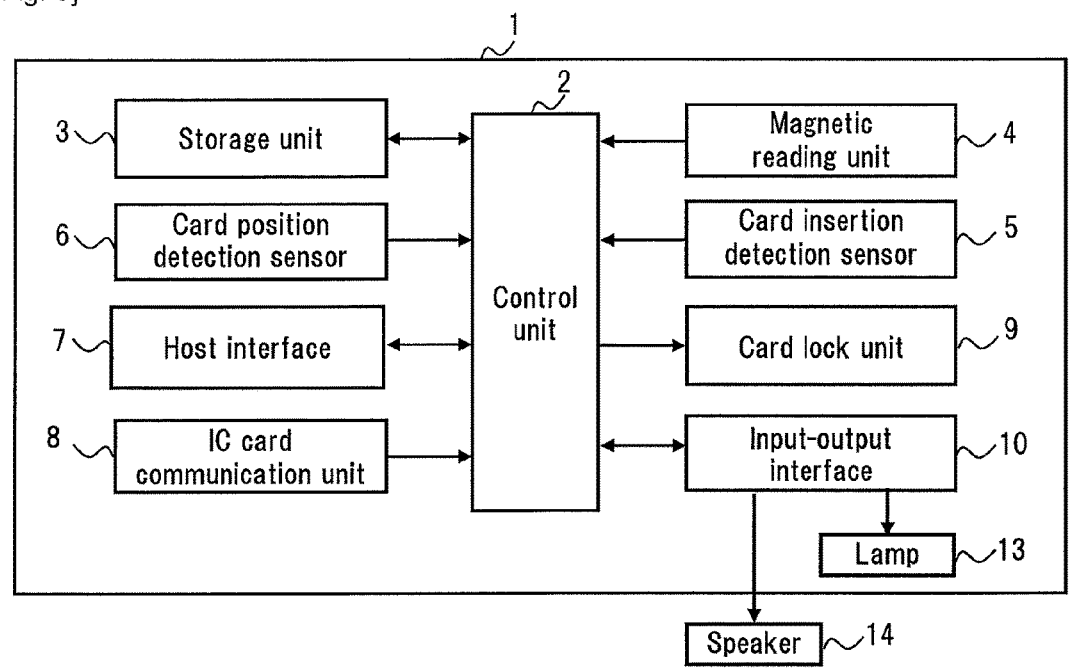

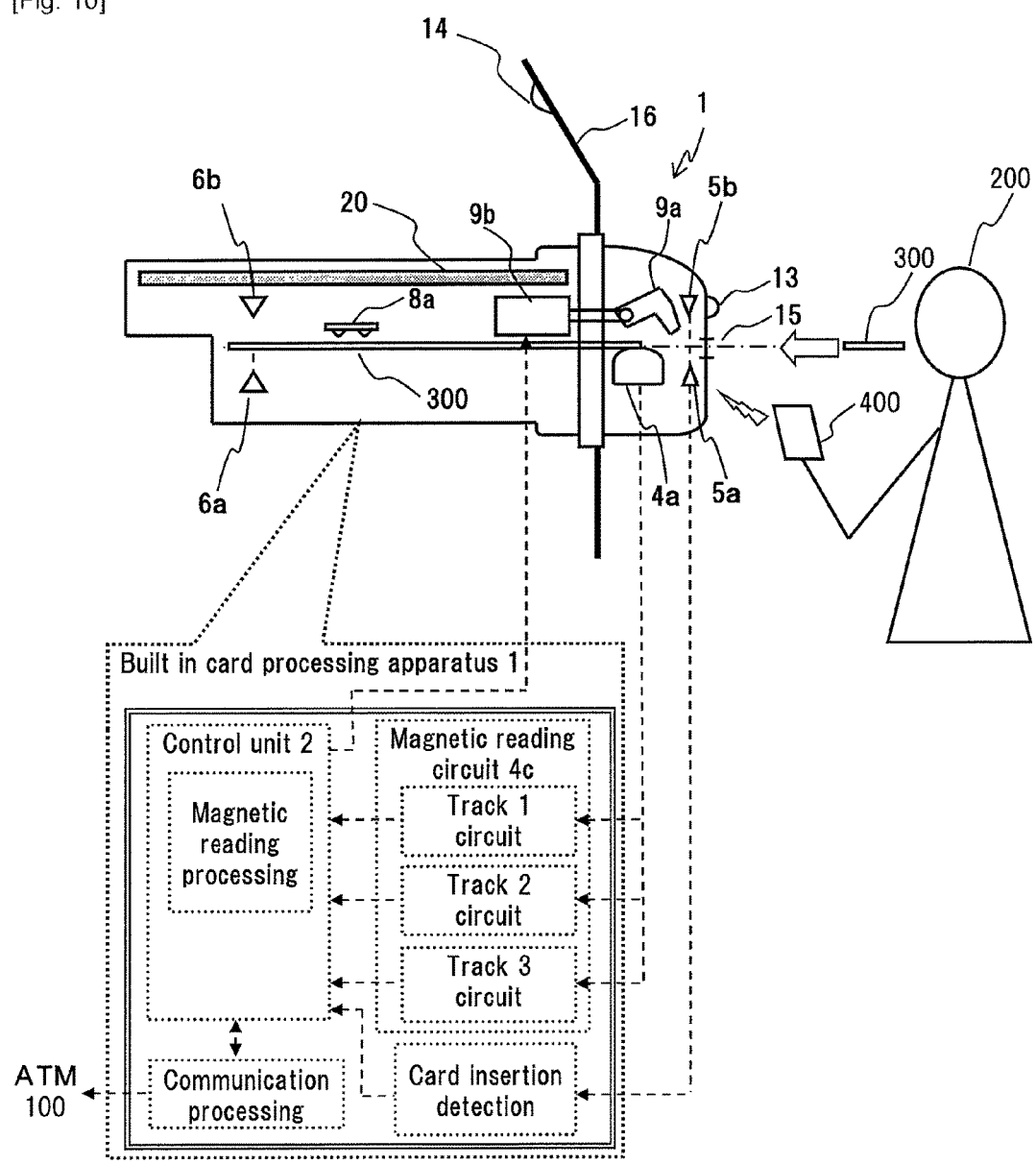
[Fig. 10]

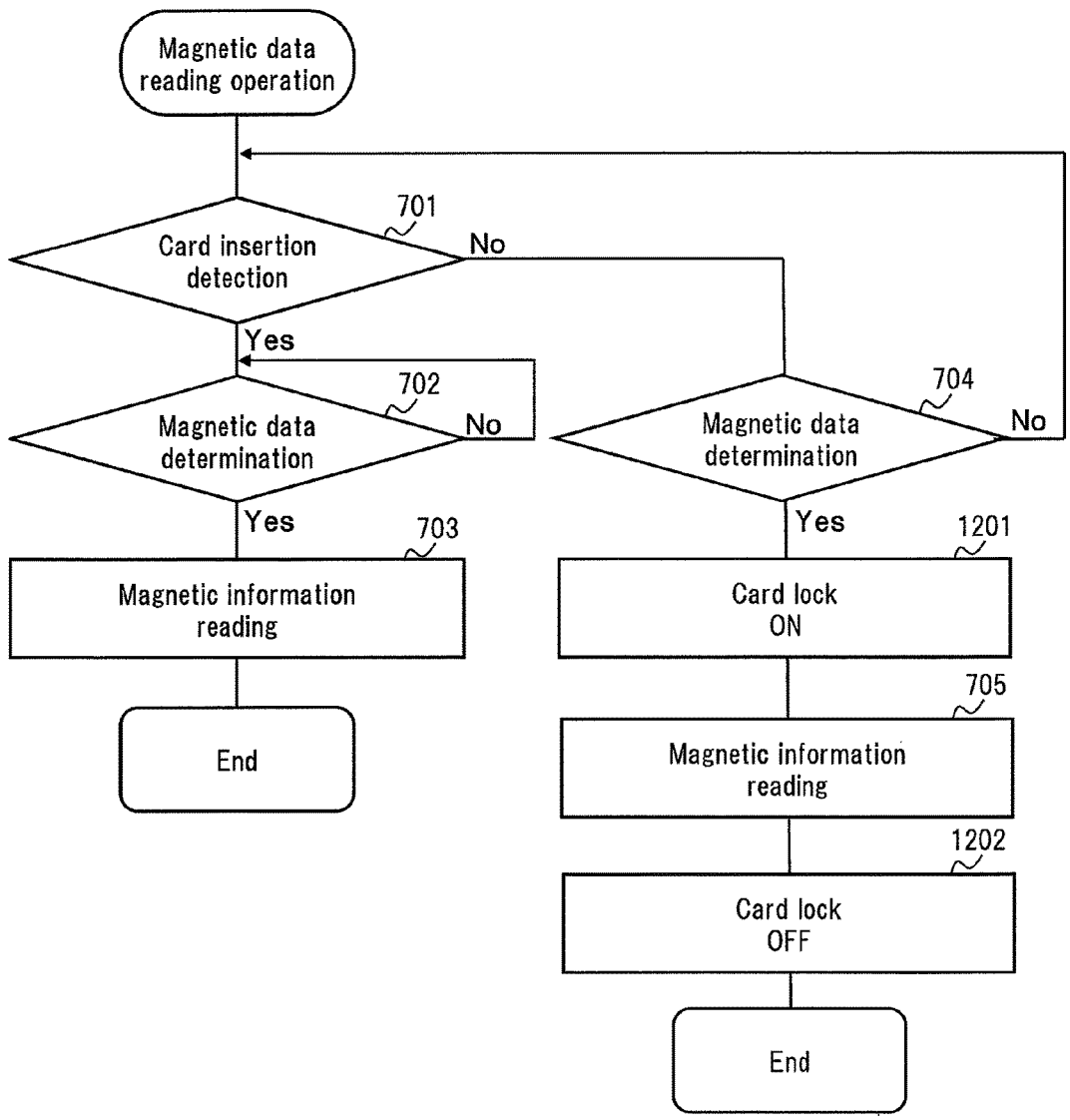
[Fig. 11]

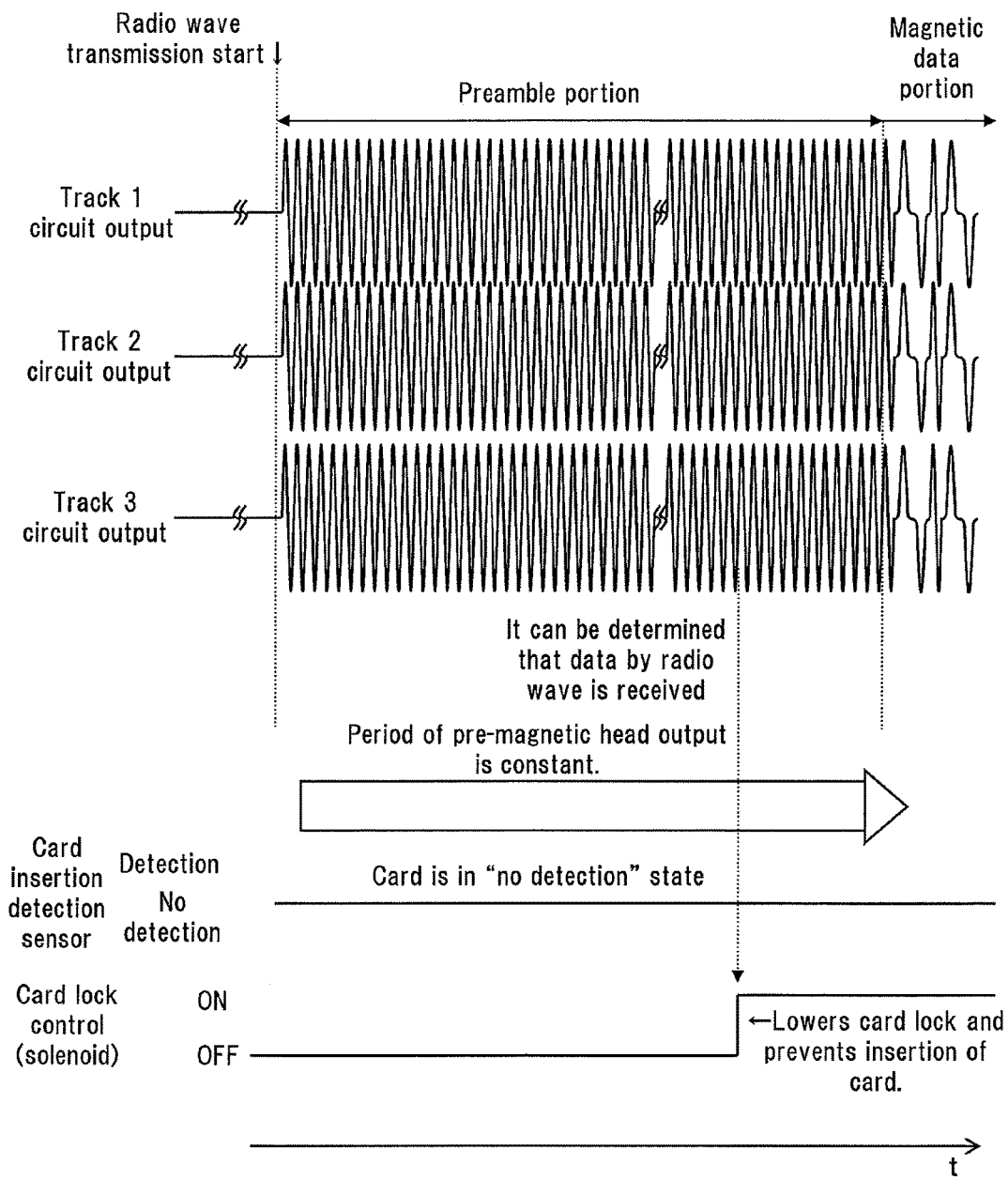

CARD PROCESSING APPARATUS AND AUTOMATIC TRANSACTION MACHINE

BACKGROUND OF THE INVENTION

1. Field of the Invention

The present invention relates to a card processing apparatus having a wireless magnetic information reading function, and to an automatic transaction machine.

2. Description of the Related Art

For example, a transaction processing terminal such as an automated teller machine (ATM) is equipped with a card processing apparatus configured to process magnetic information of a magnetic card. When a user manually inserts the magnetic card into a card insertion-removal opening or removes the magnetic card from the card insertion-removal opening, the card processing apparatus reads the magnetic information recorded in magnetic stripes of the magnetic card by a magnetic head provided near the card insertion-removal opening.

In a credit-card payment terminal, the magnetic information recorded in the magnetic stripes of the magnetic card is read by a magnetic head when the magnetic card is manually swiped through a magnetic card reading unit attached to an end surface of the credit-card payment terminal.

Nowadays, for example, technologies referred to as "Samsung Pay" and "LoopPay" that provide an effect of reading a magnetic card similar to that of the abovementioned card processing apparatus or the magnetic card reading unit are starting to be put into practical use. In those technologies, a smartphone capable of transmitting magnetic information through a radio wave is brought near a magnetic card reading unit and the magnetic information is transmitted to a credit-card payment terminal or a card processing apparatus through the radio wave (for example, U.S. Pat. No. 8,814,046 (Specification)).

SUMMARY OF THE INVENTION

However, the card processing apparatus installed in the ATM reads a magnetic signal from the magnetic head as the magnetic information only when a card insertion detection sensor determines that there is a magnetic card. When the magnetic information is transmitted through a radio wave, the magnetic card is not inserted. Therefore, there has been a problem in that the magnetic information transmitted through the radio wave cannot be read because the magnetic information transmitted through the radio wave is processed as invalid data corresponding to a noise while it is determined by the card insertion detection sensor that there are no detection signals of the magnetic card.

The present invention has been made in consideration of the abovementioned point, and an object thereof is to provide a card processing apparatus that can import and process magnetic information recorded in a magnetic card and magnetic information included in a radio wave and an automatic transaction machine. In order to solve the abovementioned problem, the present invention includes a card insertion opening, a card insertion detection sensor, a magnetic head, and a control unit. A magnetic card is to be inserted in the card insertion opening. The card insertion detection sensor is configured to detect the magnetic card inserted in the card insertion opening. The magnetic head is provided near the card insertion opening and is configured to detect a change in an electromagnetic field and output a magnetic signal. The control unit is configured to: receive the magnetic signal from the magnetic head when the card insertion detection sensor detects the magnetic card; receive the magnetic signal from the magnetic head when the card insertion detection sensor does not detect the magnetic card; acquire the magnetic signal when the magnetic signal includes a predetermined pattern; and discard the magnetic signal when the magnetic signal does not include the predetermined pattern. According to the present invention, the magnetic information recorded in the magnetic card and the magnetic information included in the radio wave can be imported and processed without providing an additional configuration to the card processing apparatus.

BRIEF DESCRIPTION OF THE DRAWINGS

FIG. 1 is a schematic configuration view of an ATM in which a card processing apparatus of Embodiment 1 is installed;

FIG. 2 is a block diagram illustrating a function of the card processing apparatus of the same Embodiment;

FIG. 3 is a schematic structure view of the card processing apparatus of the same Embodiment;

FIG. 4 is a view illustrating the positions of magnetic stripe tracks of a magnetic card of the same Embodiment;

FIG. 5 is a waveform diagram of the magnetic stripe tracks output from the magnetic head of the same Embodiment;

FIG. 6 is a time chart of magnetic reading operation by the magnetic card of the same Embodiment;

FIG. 7 is a flowchart of the operation of the card processing apparatus of the same Embodiment;

FIG. 8 is a time chart of magnetic reading operation by a radio wave of the same Embodiment;

FIG. 9 is a block diagram illustrating a function of a card processing apparatus of Embodiment 2;

FIG. 10 is a schematic structure view of the card processing apparatus of the same Embodiment;

FIG. 11 is a flowchart of the operation of the card processing apparatus of the same Embodiment; and FIG. 12 is a time chart of magnetic reading operation by a radio wave of the same Embodiment.

DETAILED DESCRIPTION OF THE EMBODIMENT

Several Embodiments are described in detail below with reference to the drawings.

Embodiment 1

(1-1) The Configuration of a Card Processing Apparatus

First, the configuration of a card processing apparatus 1 and an ATM 100 of this Embodiment is described with reference to FIG. 1 to FIG. 3.

FIG. 1 is a schematic structure view of the ATM in which the card processing apparatus of this Embodiment is installed. As illustrated in FIG. 1, the card processing apparatus 1 is installed in the ATM 100 installed in a financial institution, for example. The card processing apparatus 1 is installed in an ATM 100 in a state in which a preceding end part on a user 200 side thereof is protruding more than a front surface of the ATM 100. When the card processing apparatus 1 receives a magnetic card 300 (see FIG. 3) owned by the user 200 of the ATM 100, the card processing apparatus 1 reads magnetic information recorded in the magnetic card 300 as a magnetic signal. When the card processing apparatus 1 receives a magnetic signal transmitted from a wireless terminal 400 owned by the user 200, the card Processing apparatus 1 reads magnetic information of the wireless terminal 400 as a magnetic signal.

FIG. 2 is a block diagram illustrating a function of the card processing apparatus.

Specifically, as illustrated in FIG. 2, the card processing apparatus 1 includes a control unit 2, a storage unit 3, a magnetic reading unit 4, a card insertion detection sensor 5, a card position detection sensor 6, a host interface 7, a lamp 13, and an input-output interface 10, and the lamp 13 and a speaker 14 are coupled to the input-output interface 10.

The control unit 2 includes a microcomputer (CPU) 20 mounted on a substrate, for example, and controls the operation of each unit. The storage unit 3 includes a memory and various kinds of information is stored in the memory.

FIG. 3 is a schematic structure view of the card processing apparatus.

The front surface of the card processing apparatus 1 on the user 200 side has a card insertion opening 15 serving as an insertion-removal opening for the magnetic card 300 formed therein and has one or a plurality of LED lamps 13 fixed thereon. A plate 16 is fixed on the upper portion of the card processing apparatus 1. The speaker 14 is provided on the rear surface of the plate 16.

The magnetic reading unit 4 includes a magnetic head 4a, a circuit (not shown) configured to drive the magnetic head 4a, and a magnetic reading circuit 4c. The magnetic head 4a is provided at a section of the card processing apparatus 1 that protrudes to the user 200 side more than the front surface of the ATM 100 in a state in which the card processing apparatus 1 is installed in the ATM 100. The magnetic head 4a detects a change in an electromagnetic field and outputs a magnetic signal to the control unit 2. The magnetic head 4a reads, for example, magnetic information from magnetic stripes of the magnetic card 300 inserted in the card processing apparatus 1 and magnetic information from a radio wave transmitted from the wireless terminal 400 as magnetic signals.

The card insertion detection sensor 5 includes a light emitting element 5a and a light receiving element 5b. The light emitting element 5a and the light receiving element 5b are arranged between the card insertion opening 15 and the magnetic head 4a. The light emitted from the light emitting element 5a is reflected by the magnetic card 300 and returns to the light receiving element 5b. The card insertion detection sensor 5 detects that the magnetic card 300 has been passed between the light emitting element 5a and the light receiving element 5b and been inserted in the card processing apparatus 1 on the basis of the change of light quantity received by the light receiving element 5b, and transmits a detected signal thereof to the control unit 2. The card insertion detection sensor 5 may include a switch.

The card position detection sensor 6 includes a light sensor light emitting element 6a and a light receiving element 6b. The light sensor light emitting element 6a and the light receiving element 6b are arranged on the back side of the card processing apparatus 1 installed in the ATM 100. The light emitted from the light emitting element 6a is reflected by the front end side of the magnetic card 300 and returned to the light receiving element 6b. The card position detection sensor 6 detects the position of the magnetic card 300 inserted in the card processing apparatus 1 on the basis of the change of the light quantity received by the light receiving element 6b. The host interface 7 includes a circuit configured to transmit and receive information to and from the ATM 100.

(1-2) The Operation at the Time of Insertion of the Magnetic Card

FIG. 4 is a view illustrating the positions of a magnetic stripe track 1 to a magnetic stripe track 3 of the magnetic card. The magnetic card 300 has three types of tracks. The tracks are defined as a track 1 301, a track 2 302, and a track 3 303. Each of the tracks 1 to 3 301 to 303 have different magnetic information recorded therein. When those tracks 1 to 3 301 to 303 move in a state in which those tracks are in contact with the magnetic head 4a, three types of different magnetic signals are output from the magnetic head 4a and those three types of different magnetic signals are input to the control unit 2 via the magnetic reading circuit 4c.

FIG. 5 is a view illustrating waveforms of the magnetic stripe tracks 1 to 3 to be output from the magnetic head.

The recording density of the magnetic stripe is, for example, defined by the international standard ISO7811 and the like and the time interval for 1 bit of the magnetic waveform to be output from the magnetic head 4a changes by the moving speed of the magnetic card 300. In this Embodiment, the period of the magnetic signal of the magnetic stripe track 1 301 and the period of the magnetic signal of the magnetic stripe track 3 303 substantially match with each other. Meanwhile, the periods of the magnetic signals of the magnetic stripe track 1 and 3 301 and 303 and the period of the magnetic signal of the magnetic stripe track 2 302 do not match with each other.

Next, the configuration in the control unit 2 of the card processing apparatus 1 is described.

Return to FIG. 3. When the magnetic information is written in the magnetic card 300 inserted in the card processing apparatus 1, the magnetic head 4a outputs the magnetic information written in the magnetic stripes of the magnetic card 300 to the magnetic reading circuit 4c as magnetic signals when the section of the magnetic stripes reaches the magnetic head 4a. The magnetic reading circuit 4c receives different magnetic signals from the track 1 301, the track 2 302, and the track 3 303 and transmits those signals to the control unit 2.

The control unit 2 determines whether each of the magnetic signals received from the tracks 1 to 3 301 to 303 has a period of a magnetic signal of the magnetic card 300, a noise, or the wireless terminal 400. When the control unit 2 determines that the magnetic signal has a magnetic period of the magnetic card 300, the control unit 2 executes magnetic reading processing for reading the magnetic information written in the magnetic card 300 and outputs the magnetic information written in the magnetic card 300 as a magnetic signal. The control unit 2 executes communication processing for transmitting the output magnetic signal to a higher-level apparatus (ATM 100) via the host interface 7.

FIG. 6 is a time chart for describing the operation of the magnetic reading unit at the time of insertion of the magnetic card.

Magnetic information having regular intervals referred to as a preamble portion is written near a leading end of the magnetic stripe of the magnetic card 300 for each of the tracks 1 to 3 301 to 303 at different timings. When the magnetic card 300 inserted in the card insertion opening 15 passes through the magnetic head 4a, magnetic signals different for each of the tracks 1 to 3 301 to 303 are output from the magnetic head 4a. Now, the user 200 may insert the magnetic card 300 in the card insertion opening 15 by pushing the magnetic card 300 by hand. In that case, the speed of the inserted magnetic card 300 gradually increases and the intervals between the magnetic signals output from the magnetic head 4a also gradually become shorter. That is, the magnetic signals output from the magnetic head 4a gradually becomes denser in the time axial direction. After a part of the magnetic card 300 from the leading end portion to a certain section in which the preamble portion is written of the magnetic stripe passes through the magnetic head 4*a*, a magnetic data portion in which the magnetic information is written passes through the magnetic head 4*a*. As a result, magnetic information different for each of the tracks 1 to 3 301 to 303 is output from the magnetic head 4*a* as a magnetic signal. When the magnetic card 300 is inserted in the card processing apparatus 1, the control unit 2 suspends the processing of the magnetic signal of the wireless terminal 400 while the magnetic signal of the magnetic card 300 is being processed. At the same time, the control unit 2 outputs an audio guidance indicating the suspension from the speaker 14 and lights or blinks the lamp 13. As a result, the control unit 2 prevents malfunction due to a wireless signal of the wireless terminal 400. At that time, the speaker 14 and the lamp 13 function as notification units configured to notify the user that the processing of the magnetic information of the wireless terminal 400 is suspended. When the ATM 100 includes a touch panel configured to input and output information, the control unit 2 may notify the user that the processing of the magnetic signal of the wireless terminal 400 is suspended during the processing of the magnetic signal of the magnetic card 300 also on the touch panel.

(1-3) The Operation at the Time of Reception of Magnetic Information by the Magnetic Card Insertion and the Radio Wave Return to FIG. 1. When the user 200 operates the wireless terminal 400 owned by the user 200 and transmits the magnetic information through the radio wave, the magnetic head 4*a* provided near the front surface of the card processing apparatus 1 is near the wireless terminal 400, and hence can easily receive the magnetic information by the radio wave as a magnetic signal. Meanwhile, the magnetic head 4*a* easily receives, for example, an external noise of a wireless LAN and the like. Next, the operation of reading the magnetic information at the time of card insertion and at the time of wireless terminal operation is described.

FIG. 7 is a flowchart of the operation of the magnetic reading unit by the card processing apparatus.

When the magnetic card 300 is inserted in the card insertion opening 15, the control unit 2 detects by the card insertion detection sensor 5 that the magnetic card 300 has been inserted (S701: YES, see FIG. 6). Then, when the section of the magnetic stripes of the magnetic card 300 reaches the position of the magnetic head 4*a*, a track 1 circuit, a track 2 circuit, and a track 3 circuit of the magnetic reading circuit 4*c* output a preamble portion and a magnetic data portion that are different for each of the tracks 1 to 3 301 to 303 as magnetic signals. The control unit 2 determines whether the pattern of the output preamble portion includes a predetermined pattern (S702). Specifically, the control unit 2 determines whether the pattern of the preamble portion includes the pattern having a certain period and whether the period of the magnetic signal of the track 1 301 and the period of the magnetic signal of the track 3 303 substantially match with each other. When the determination result of Step S702 is true (S702: YES), the control unit executes the magnetic reading processing for reading the magnetic data portion (S703). Then, the control unit 2 outputs the magnetic data portion via the host interface 7 as a magnetic signal and executes the communication processing for transmitting the magnetic signal to the ATM 100. When the determination result of Step S702 is false (S702: NO), the control unit 2 discards the determined magnetic signal and starts over the determination.

When the card insertion detection sensor 5 does not detect the insertion of the magnetic card 300 (S701: NO) and the user 200 uses the wireless terminal 400 of the user 200, to thereby transmit the magnetic information by the radio wave, the magnetic head 4*a* receives the radio wave transmitted from the wireless terminal 400. Then, the magnetic reading circuit 4*c* outputs the magnetic signal acquired from the received radio wave to the control unit 2. The track 1 circuit, the track 2 circuit, and the track 3 circuit of the magnetic reading circuit 4*c* output the same magnetic signals unlike the case for the magnetic card 300. Further, the magnetic head 4*a* outputs a Preamble portion having a certain period unlike the external noise that randomly occurs, and hence the control unit 2 determines whether the pattern of the output preamble portion includes a predetermined pattern (S704). Specifically, the control unit 2 determines whether the pattern of the preamble portion includes a pattern having a certain period and whether the periods of the magnetic signals output from the track 1 circuit, the track 2 circuit, and the track 3 circuit of the magnetic reading circuit 4*c* match with each other. When the determination result of Step S704 is true (S704: YES), that is, the received magnetic signal is not determined as a noise but is determined as a magnetic signal of the wireless terminal 400, the control unit 2 executes the magnetic reading processing for reading the magnetic data portion (S705). The control unit 2 outputs the read magnetic information as the magnetic signal and executes the communication processing for transmitting the magnetic data portion to the ATM 100 as a magnetic signal via the host interface 7. When the determination result of Step S704 is false (S704: NO), the control unit 2 discards the determined magnetic signal and returns to Step S701.

FIG. 8 is a time chart for describing magnetic reading operation when the magnetic information included in the radio wave is received.

The preamble portion of the magnetic signal included in the radio wave transmitted from the wireless terminal 400 has a certain predetermined period and the period does not become gradually faster. Thus, when the period of the preamble portion of the magnetic signal output from the magnetic reading circuit 4*c* is a predetermined period, the control unit 2 determines that the magnetic signal is not an external noise due to the wireless LAN and the like but is a magnetic signal due to the radio wave transmitted from the wireless terminal 400. Then, the control unit 2 reads the magnetic signal output from the magnetic reading circuit 4*c* and transmits the read magnetic signal to the ATM 100 via the host interface 7.

According to this Embodiment, the card processing apparatus 1 includes the card insertion opening 15, the card insertion detection sensor 5, the magnetic head 4*a*, and the control unit 2. The magnetic card 300 is to be inserted in the card insertion opening 15. The card insertion detection sensor 5 is configured to detect the magnetic card 300 inserted in the card insertion opening 15. The magnetic head 4*a* is provided near the card insertion opening 15 and is configured to detect a change in an electromagnetic field and output a magnetic signal. When the card insertion detection sensor 5 detects the magnetic card 300, the control unit 2 receives the magnetic signal from the magnetic head 4*a*. When the card insertion detection sensor 5 does not detect the magnetic card 300, the control unit 2 receives the magnetic signal from the magnetic head 4*a*. When the magnetic signal includes a predetermined pattern, the control unit 2 acquires the magnetic signal. When the magnetic signal does not include the predetermined pattern, the control unit 2 discards the magnetic signal. As a result, the card processing apparatus 1 can import and process both magnetic information of the magnetic information recorded in the magnetic card 300 and the magnetic information included in the radio wave transmitted from the wireless terminal 400. The card processing apparatus 1 can read the magnetic information by the radio wave without additionally providing new exclusive sensors and apparatuses configured to read the magnetic information included in the radio wave.

The user 200 does not need to press an operation button before the magnetic information is transmitted from the wireless terminal 400 through the radio wave, for example, and the convenience for the user 200 can be improved.

The control unit 2 receives a magnetic signal including an external noise from the magnetic head 4*a*, acquires the magnetic signal when the magnetic signal includes a predetermined pattern, and discards the magnetic signal when the magnetic signal does not include the predetermined pattern. As a result, the card processing apparatus 1 can suppress malfunction of the card processing apparatus 1 every time an external noise of a wireless LAN and the like occur without invalidating the function of the card insertion detection sensor 5 even when the magnetic information included in the radio wave transmitted from the wireless terminal 400 is read.

The control unit 2 acquires the received magnetic signal when the received magnetic signal has a predetermined period and hence the signal can be easily read with high accuracy.

In a case in which the magnetic information by the radio wave is received, the track 1 circuit, the track 2 circuit, and the track 3 circuit output the same magnetic data. Thus, the control unit 2 compares those three track data with each other and checks whether the magnetic patterns (data) of each of the tracks 1 to 3 301 to 303 match with each other. When the magnetic patterns match with each other, the control unit 2 acquires the magnetic information. As a result, the reliability of reading the magnetic data can be enhanced.

The control unit 2 suspends the processing of the magnetic signal from the wireless terminal 400 while processing the magnetic signal recorded in the magnetic card 300. As a result, even if the control unit 2 receives a noise of the wireless terminal 400 or a disturbance while processing the magnetic signal recorded in the magnetic card 300, the magnetic information from the wireless terminal 400 and the magnetic information recorded in the magnetic card 300 can be prevented from being mixed together.

While the control unit 2 is detecting the magnetic card 300 and processing the magnetic signal, the speaker 14 and the lamp 13 notifies the user that the processing of the magnetic signal from the wireless terminal 400 is suspended. As a result, during the processing of the magnetic signal recorded in the magnetic card 300, erroneous operation in which the user 200 tries to transmit the magnetic signal from the wireless terminal 400 can be suppressed.

Embodiment 2

(2-1) The Configuration of the Card Processing Apparatus

Next, Embodiment 2 is described with reference to FIG. 9 and FIG. 10. Detailed descriptions on parts in the configuration of the card processing apparatus 1 according to this Embodiment similar to that in Embodiment 1 are omitted and the configuration and the operation relating to an IC card communication unit 8 and a card lock unit 9 different from Embodiment 1 are described in detail below.

FIG. 9 is a block diagram illustrating a function of a card processing apparatus according to Embodiment 2.

The card processing apparatus 1 of this Embodiment further includes the IC card communication unit 8 and the card lock unit 9.

FIG. 10 is a schematic structure view of the card processing apparatus.

The IC card communication unit 8 includes an IC contact unit 8*a* and a circuit (not shown) configured to transmit and receive a signal to and from an IC card. The IC card communication unit 8 communicates with the IC card when the IC contact unit 8*a* is brought into contact with the IC card. Specifically, the IC card communication unit 8 reads information recorded in an IC chip of the IC card inserted in the card insertion opening 15 and provides the information to the control unit 2.

The card lock unit 9 includes a card lock lever 9*a*, a solenoid 9*b*, and a circuit (not shown). The card lock lever 9*a* prevents the IC card from being pulled out when the IC card communication unit 8*a* is communicating with the IC card. The solenoid 9*b* causes the card lock lever 9*a* to appear on a conveyance surface of the magnetic card 300. The configuration of the control unit 2, the storage unit 3, the magnetic reading unit 4, the card insertion detection sensor 5, the card position detection sensor 6, the host interface 7, the IC card communication unit 8, the lamp 13, the speaker 14, and the input-output interface 10 is similar to that in Embodiment 1 and description thereof is omitted.

FIG. 11 is a flowchart of the operation of the magnetic reading unit by the card processing apparatus.

(2-2) The Operation at the Time of Reading of Magnetic Information at the Time of Insertion of the Magnetic Card The operation at the time of insertion of the magnetic card 300 (S701 to S703) is similar to that in Embodiment 1 and hence description thereof is omitted.

(2-3) The Operation at the Time of Reading of the Magnetic Information by the Radio Wave For the operation at the time of reading of the magnetic information included in the radio wave transmitted from the wireless terminal 400, detailed descriptions of parts similar to that in Embodiment 1 are omitted and the operation relating to the card lock unit 9 different from Embodiment 1 is described below with reference to FIG. 11.

The operation at the time of reading of the magnetic information from the wireless terminal 400 included in the radio wave has a configuration similar to that in Embodiment 1 from the transmission of the magnetic information by the radio wave using the wireless terminal 400 of the user 200 to the determination of the magnetic signal as a magnetic signal of the wireless terminal 400 (S701, S704). Thus, the description of the operation up to the determination of the magnetic signal as a magnetic signal of the wireless terminal 400 is omitted. After the received signal is determined as a magnetic signal of the wireless terminal 400 (S704: YES), the control unit controls the solenoid 9*b* so that the card lock lever 9*a* moves to the card conveyance surface and the magnetic card 300 is locked (S1201). As a result, malfunction is prevented by preventing the magnetic card 300 inserted in the card processing apparatus 1 from being pulled out from the card processing apparatus 1 and preventing other magnetic cards 300 from being newly inserted in the card processing apparatus 1. Lastly, as in Embodiment 1, the control unit 2 executes the magnetic reading processing for reading the magnetic information transmitted through the radio wave as magnetic data (S705), moves the card lock lever 9*a* to its original position, and unlocks the magnetic card 300 (S1202). FIG. 12 is a time chart for describing the operation at the time of reception of the magnetic information included in the radio wave transmitted from the wireless terminal 400.

At the time point at which the magnetic signal is determined as a magnetic signal included in the radio wave transmitted from the wireless terminal 400, the control unit 2 performs card lock control and lowers the card lock lever 9a, to thereby prevent the insertion of the magnetic card 300. At the same time, the control unit 2 reads the signal output from the magnetic reading circuit 4c as magnetic information and transmits the read magnetic information to the ATM 100 via the host interface 7. According to this Embodiment, the card processing apparatus further includes the card lock unit 9 configured to hold the magnetic card 300 inserted in the card insertion opening 15 and the control unit 2 causes the card lock unit 9 to restrict the insertion of the magnetic card 300 into the card insertion opening 15 while the control unit 2 is processing the magnetic signal of the wireless terminal. As a result, when the magnetic information included in the radio wave transmitted from the wireless terminal 400 is received, the magnetic information recorded in the magnetic card 300 and the magnetic information included in the radio wave transmitted from the wireless terminal 400 can be separately imported and processed.

Embodiment 3

A card processing apparatus according to Embodiment 3 is described.

In the description of the operation of the magnetic reading unit 4 at the time of insertion of the magnetic card 300 of the abovementioned Embodiments, the control unit 2 suspends the processing of the magnetic signal of the wireless terminal 400 while the magnetic signal of the magnetic card 300 is being processed. However, the control unit 2 of the card processing apparatus according to Embodiment 3 suspends the processing of the magnetic signal of the magnetic card 300 while processing the magnetic signal of the wireless terminal 400. As a result, for example, even if the user 200 inserts the magnetic card 300 while the magnetic information of the wireless terminal 400 is being read, the magnetic information of the wireless terminal 400 and the magnetic information of the magnetic card 300 can be prevented from being mixed.

The speaker 14 and the lamp 13 may notify the user that the processing of the magnetic signal of the magnetic card 300 is suspended while the control unit 2 is processing the magnetic signals of the wireless terminal 400. As a result, during the processing of the magnetic signal of the wireless terminal 400, the user 200 can easily recognize that the control unit 2 is processing the magnetic signal and erroneous operation in which the user pulls out the magnetic card 300 or inserts the magnetic card 300 into the card processing apparatus 1, for example, can be prevented. In particular, a malfunction in which the wireless terminal 400 is separated from the magnetic head 4a during the processing of the magnetic signal of the wireless terminal 400 and the magnetic signal cannot be received in the middle of the processing can be suppressed. When the ATM 100 includes a touch panel configured to input and output information, the control unit 2 may notify the user that the processing of the wireless signal of the wireless terminal 400 is suspended during the processing of the magnetic signal of the wireless terminal 400 also on the touch panel.

The present invention is not limited to the abovementioned Embodiments and includes various modified examples.

For example, the card processing apparatus 1 in the abovementioned Embodiments can be applied to automatic transaction machines such as the ATM 100. Specifically, when an automatic transaction machine including an input-output unit (touch panel) configured to input and output information, a card processing unit (card reader) configured to read and process the magnetic information recorded in the magnetic card 300, a receipt processing unit configured to record and process information on a receipt, a cash processing unit configured to input and output cash (including bills and coins), and a control unit configured to perform overall integrated control and transmit and receive information to and from a database is configured, the components of the card processing apparatus 1 can be installed in the card processing unit.

The abovementioned Embodiments have been described in detail for the ease of understanding of the present invention and the present invention does not need to include all of the configurations described above. Further, a part of the configurations of a given Embodiment may be replaced with the configurations of another Embodiment. In addition, the configurations of another Embodiment may be added to the configurations of a Given Embodiment. Still further, other configurations may be added to, deleted from, or replace a part of the configurations of each Embodiment.

Some of or all of the configurations, functions, and the like described above may be implemented by hardware by, for example, designing those as an integrated circuit. The configurations, functions, and the like described above may be implemented by software through a processor's interpretation and execution of programs for implementing the respective functions. The programs for implementing the functions and information such as tables and files can be put in a memory, in a recording device such as a hard disk or an SSD (Solid State Drive), or in a storage medium such as an IC card, an SD card, or a DVD.

What is claimed is:

1. A card processing apparatus, comprising:
a card insertion opening in which a magnetic card is to be inserted;
a card insertion detection sensor configured to detect the magnetic card inserted in the card insertion opening;
a magnetic head provided near the card insertion opening and configured to read magnetic information from magnetic stripe of a magnetic card and magnetic information from radio waves sent from a radio terminal as a magnetic signal and output a magnetic signal;
a card lock unit configured to hold the magnetic card inserted in the card insertion opening; and
a control unit configured to: receive the magnetic signal from the magnetic head when the card insertion detection sensor detects the magnetic card; receive the magnetic signal from the magnetic head when the card insertion detection sensor does not detect the magnetic card; acquire the magnetic signal when the magnetic signal includes a predetermined pattern; discard the magnetic signal when the magnetic signal does not include the predetermined pattern; and cause the card lock unit to restrict insertion of the magnetic card into the card insertion opening while the control unit is processing a magnetic signal of a wireless terminal.

2. The card processing apparatus according to claim 1, wherein the control unit is configured to acquire the received magnetic signal when the received magnetic signal has a predetermined period.

3. The card processing apparatus according to claim 1, wherein the control unit is configured to acquire magnetic signals that have been received without the magnetic card being detected, when the patterns of a plurality of tracks of the magnetic signals match with each other.

4. The card processing apparatus according to claim 1, wherein the control unit is configured to suspend processing of a magnetic signal of a wireless terminal while the magnetic signal of the magnetic card is being processed.

5. The card processing apparatus according to claim 1, wherein the control unit further includes a notification unit configured to notify a user that the magnetic signal of the magnetic card is being processed when the magnetic card is detected and the magnetic signal is processed.

6. The card processing apparatus according to claim 1, wherein the control unit is configured to suspend processing of the magnetic signal of the magnetic card while a magnetic signal of a wireless terminal is being processed.

7. The card processing apparatus according to claim 1, wherein the control unit further includes a notification unit configured to notify a user that the magnetic signal of the wireless terminal is being processed when the magnetic signal is processed without the magnetic card being detected.

8. An automatic transaction machine, comprising
a card insertion opening in which a magnetic card is to be inserted;
a card insertion detection sensor configured to detect the magnetic card inserted in the card insertion opening;
a magnetic head provided near the card insertion opening and configured to read magnetic information from magnetic stripe of a magnetic card and magnetic information from radio waves sent from a radio terminal as a magnetic signal and output a magnetic signal;
a card lock unit configured to hold the magnetic card inserted in the card insertion opening; and
a control unit configured to: receive the magnetic signal from the magnetic head when the card insertion detection sensor detects the magnetic card; receive the magnetic signal from the magnetic head when the card insertion detection sensor does not detect the magnetic card; acquire the magnetic signal when the magnetic signal includes a predetermined pattern; and discard the magnetic signal when the magnetic signal does not include the predetermined pattern, and
wherein the control unit is configured to cause the card lock unit to restrict insertion of the magnetic card into the card insertion opening while the control unit is processing a magnetic signal of a wireless terminal.

9. The automatic transaction machine according to claim 8, wherein the control unit is configured to acquire the received magnetic signal when the received magnetic signal has a predetermined period.

10. The automatic transaction machine according to claim 8, wherein the control unit is configured to acquire magnetic signals that have been received without the magnetic card being detected, when the patterns of a plurality of tracks of the magnetic signals match with each other.

11. The automatic transaction machine according to claim 8, wherein the control unit is configured to suspend processing of a magnetic signal of a wireless terminal while the magnetic signal of the magnetic card is being processed.

12. The automatic transaction machine according to claim 8, wherein the control unit further includes a notification unit configured to notify a user that the magnetic signal of the magnetic card is being processed when the magnetic card is detected and the magnetic signal is processed.

13. The automatic transaction machine according to claim 8, wherein the control unit is configured to suspend processing of the magnetic signal of the magnetic card while a magnetic signal of a wireless terminal is being processed.

14. The automatic transaction machine according to claim 8, wherein the control unit further includes a notification unit configured to notify a user that the magnetic signal of the wireless terminal is being processed when the magnetic signal is processed without the magnetic card being detected.

* * * * *